US012619732B2

(12) United States Patent
Sayyed et al.

(10) Patent No.: US 12,619,732 B2
(45) Date of Patent: May 5, 2026

(54) SECURE BOOT TELEMETRY IN A HETEROGENEOUS COMPUTING PLATFORM

(71) Applicant: Dell Products L.P., Round Rock, TX (US)

(72) Inventors: Ibrahim Sayyed, Georgetown, TX (US); Alan H. Abdelhalim, Pflugerville, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 18/625,291

(22) Filed: Apr. 3, 2024

(65) Prior Publication Data

US 2025/0315532 A1    Oct. 9, 2025

(51) Int. Cl.
*G06F 21/57* (2013.01)

(52) U.S. Cl.
CPC ...... *G06F 21/575* (2013.01); *G06F 2221/034* (2013.01)

(58) Field of Classification Search
CPC .......................... G06F 21/575; G06F 2221/034
See application file for complete search history.

(56) References Cited

U.S. PATENT DOCUMENTS

| | | | |
|---|---|---|---|
| 2015/0324137 A1* | 11/2015 | Wu | G06F 12/08 |
| | | | 713/2 |
| 2016/0378628 A1* | 12/2016 | Nguyen | G06F 11/008 |
| | | | 714/40 |
| 2018/0173441 A1* | 6/2018 | Cargnini | G06F 3/065 |
| 2018/0254823 A1* | 9/2018 | Miller | H04L 67/75 |
| 2020/0367790 A1* | 11/2020 | Zhou | A61B 5/14542 |
| 2022/0200968 A1* | 6/2022 | Helmick | H04L 9/0825 |
| 2022/0269543 A1* | 8/2022 | Samuel | G06F 9/5016 |
| 2022/0404999 A1* | 12/2022 | Rajagopalan | G06F 11/3034 |
| 2023/0169166 A1* | 6/2023 | Shachar | G06N 5/01 |
| | | | 726/23 |
| 2024/0134653 A1* | 4/2024 | Sayyed | G06F 9/4411 |
| 2025/0068530 A1* | 2/2025 | Montero | G06F 9/4406 |
| 2025/0209185 A1* | 6/2025 | York | G06F 21/604 |

* cited by examiner

*Primary Examiner* — Zahid Choudhury
(74) *Attorney, Agent, or Firm* — Fogarty LLP

(57) ABSTRACT

Systems and methods include an Information Handling System (IHS) that is adapted to collect boot telemetry in a secure manner. Boot code of the IHS is executed to initiate a boot sequence that includes the generation of boot telemetry. The boot telemetry is collected in a partition of an NVRAM (Non-Volatile Random-Access Memory) of the IHS. When the capacity of the partition of the NVRAM reaches a threshold, the boot telemetry is transmitted from the NVRAM to a security device of an SoC (System-on-Chip) of the IHS for encryption of the boot telemetry. The encrypted boot telemetry is stored in an SSD (Solid-State Drive) of the IHS.

20 Claims, 4 Drawing Sheets

400

100

400

SECURE BOOT TELEMETRY IN A HETEROGENEOUS COMPUTING PLATFORM

FIELD

This disclosure relates generally to Information Handling Systems (IHSs), and more specifically, to systems and methods for securing telemetry generated by IHSs.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS may be configured to generate a wide variety of telemetry that characterizes the operation of: the IHS, individual hardware components of the IHS, software operating on the IHS and/or subsystems of the IHS. Telemetry may be generated and collected throughout the operation of an IHS, including while booting the IHS. Boot telemetry may include information describing the computing architecture of an IHS and may also include information that could be used to compromise the booting procedures used by the IHS.

SUMMARY

In various embodiments, Information Handling Systems (IHSs) may include: an SoC (System-on-Chip); an SSD (Solid-State Drive); an NVRAM (Non-Volatile Random-Access Memory) storing boot instructions; and one or more processors coupled to the NVRAM, wherein execution of the boot instructions by the processors causes the IHS to: initiate a boot sequence that includes generating boot telemetry; collect the boot telemetry in a partition of the NVRAM; when a capacity of the partition of the NVRAM reaches a threshold, transmit boot telemetry from the NVRAM to a security device of the SoC for encryption of the boot telemetry; and store the encrypted boot telemetry in the SSD.

In some embodiments, the boot sequence comprises a UEFI boot sequence. In some embodiments, the boot instructions comprise UEFI boot code. In some embodiments, the NVRAM is exclusively accessible to the UEFI boot code. In some embodiments, the UEFI boot code transmits the boot telemetry from the NVRAM to the security device of the SoC via a interconnect of the SoC. In some embodiments, the interconnect of the SoC comprises a signaling pathway that is exclusively accessible to the UEFI boot code. In some embodiments, execution of the boot code by the processors further causes the IHS to load additional boot code for transmitting boot telemetry from the NVRAM to the security device for encryption when the capacity of the partition of the NVRAM reaches the threshold. In some embodiments, the security device of the SoC comprises a device dedicated to implementing security protocols for use by the IHS. In some embodiments, the boot telemetry is encrypted by the SoC using an encryption key of a keypair controlled by the IHS. In some embodiments, the boot telemetry is encrypted and stored without use of capabilities provided by an operating system of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) containing a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc., which typically include ARM core(s).

Figure 1:
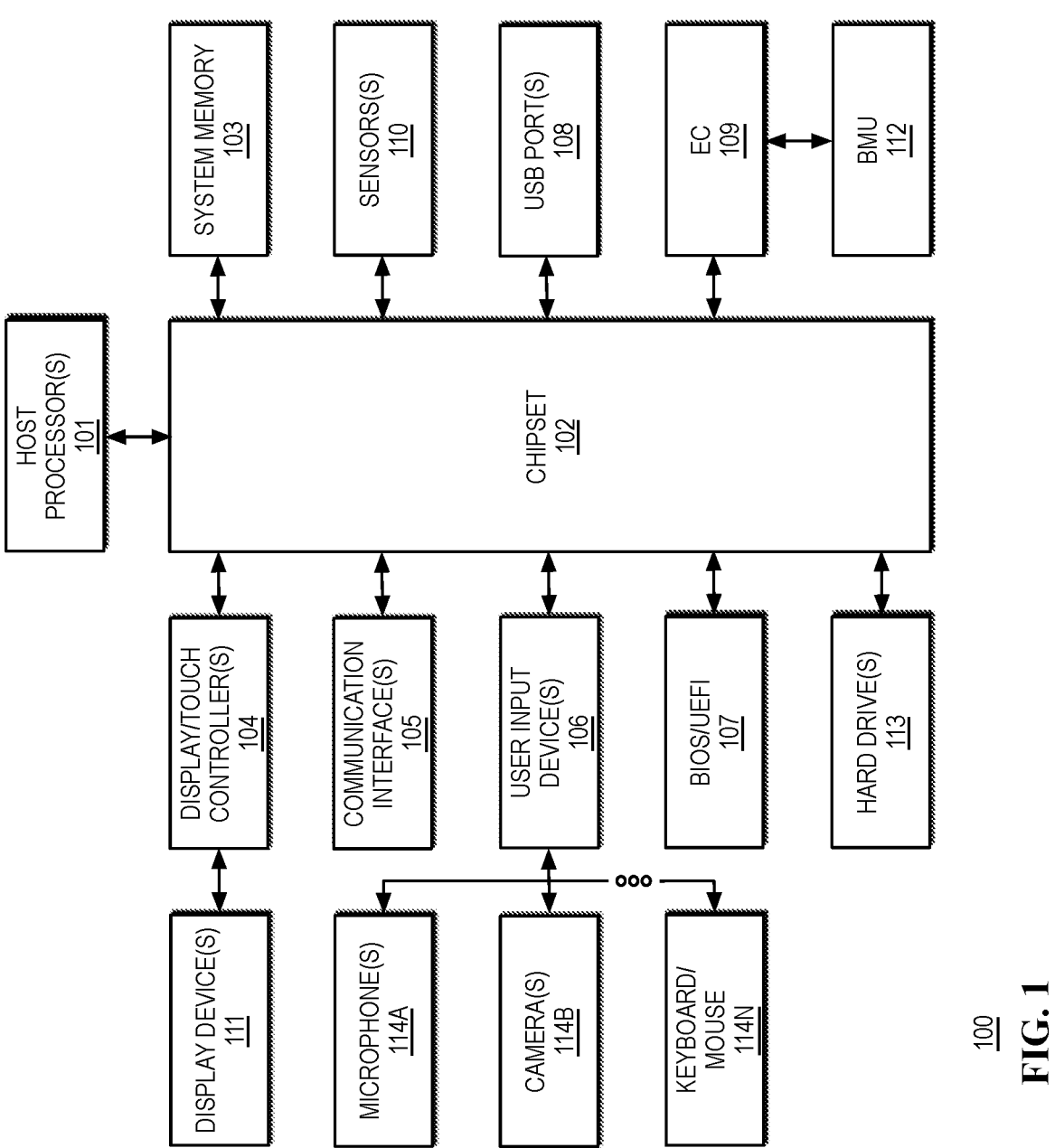
FIG. 1 is a diagram illustrating examples of components of an Information Handling System (IHS) that is configured, according to some embodiments, for securing boot telemetry generated by the IHS.

FIG. 1 is a block diagram of components of an IHS (Information Handling System) 100 that, in some embodiments, may include a heterogenous computing platform, as described in additional detail below, and that is configured to secure boot telemetry generated by the IHS, in particular to support boot sequence protocols that collect, encrypt and offload boot telemetry such that sensitive boot telemetry remains stored by the IHS in a secured manner at all times. As depicted, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more or Graphics Processor Units (GPUs) on a graphics bus, such as an Accelerated Graphics Port (AGP) or PCIe bus. As shown, display controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS) 107 is coupled to chipset 102. Unified Extensible Firmware Interface (UEFI) was designed as a successor to BIOS, and many modern IHSs utilize UEFI in addition to or instead of a BIOS. Accordingly, as used herein, the term "BIOS" is intended to also encompass UEFI such that these terms may be used interchangeably. In operation, UEFI 107 provides an abstraction layer that allows the OS to interface with certain hardware components of the IHS 100. Upon booting of IHS 100, host processor(s) 101 may utilize program instructions of UEFI 107 to initialize and test hardware components that are coupled to IHS 100, and to load host OS 312 for use by IHS 100. Via the hardware abstraction layer provided by UEFI, software applications executed by host processor(s) 101 and/or SoCs 200 can interface with certain I/O devices that are coupled to IHS 100.

As described in additional detail below, booting of IHS 100 may be conducted according to boot sequence procedures, such as according to a UEFI boot sequence. During the boot sequence of an IHS 100, a variety of telemetry may be generated by hardware and software of the IHS. This boot telemetry may provide important diagnostic information relating to booting and initialization of an IHS 100. As such, some of this boot telemetry may include information that could potentially be misused to compromise or otherwise interfere with the operation of IHS 100. For instance, boot telemetry may specify the loading of specific boot code and the memory location from which the boot code was loaded. Boot telemetry may also specify cryptographic information of the IHS, such as the stored location of cryptographic keys. The boot telemetry may also specify details relating the software that is being loaded for operation by the IHS and the storage location from where it is being loaded. All such boot telemetry may provide malicious actors with valuable information that may be used in compromising an IHS 100. Accordingly, in embodiments, boot telemetry may be secured such that the telemetry remains secured at all times during its collection and storage, both during and after completion of the boot sequence.

Embedded Controller (EC) 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostics, and remediation over an OOB or sideband network, etc.

Unlike other devices in IHS 100, EC 109 may be operational from IHS being powered, in particular before other devices are fully running or even powered. As such, EC 109 firmware may be responsible for interfacing with a power adapter to manage the various power states that may be supported by IHS 100. Power operations of the EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

From the perspective of users, IHS 100 may appear to be either "on" or "off," without any other detectable power states. In some embodiments, however, an IHS 100 may support multiple power states that may correspond to the states defined in the Advanced Configuration and Power Interface (ACPI) specification, such as: S0, S1, S2, S3, S4, S5, and G3. For example, when an IHS 100 is operating in S0 working mode, the IHS is operational, but some hardware components that are not in use may still be individually configured in low power states. In an S0 low-power, idle mode ("Sleep" or "Modern Standby"), an IHS 100 remains partially running with various capabilities of the IHS (e.g., displays, network controllers) may be powered down and other capabilities (e.g., EC, processors) may be in low-power standby modes, thus supporting the ability of the IHS to quickly transition from to a full-power, working S0 mode in response to various events. In the past, S3 was commonly used as a default "Sleep state." However, many IHSs 100 utilize the described Modern Standby, which may be designated as a hybrid "S0ix" mode, where some or all of the internal hardware of IHS 100 may be placed into their lowest power state, while still supporting code execution that allows fast response and transition of the IHS to a working S0 mode.

An IHS 100 may additionally or alternatively support other low-power modes, such as S1-S3 (that may also be referred to as "Sleep" modes), where the IHS may appear to users to be in an off state. Some IHSs may support only one or two of these states, where the number of distinct states may be a reflection of power saving features of the IHS that have been selected for use. For instance, the amount of power consumed in states S1-S3 is less than S0 and more than S4. An S3 mode consumes less power than S2, and S2 consumes less power than S1. In states S1-S3, volatile memory may be periodically refreshed in order to maintain the operating state of the IHS, with some components remaining powered so that the IHS may wake based on inputs from a keyboard, Local Area Network (LAN), or a Universal Serial Bus (USB) device.

In the S4 state ("Hibernate"), power consumption is reduced to its lowest level. The IHS saves the contents of volatile memory to a hibernation file and some components remain powered, allowing the IHS to wake based on detected input from the keyboard, LAN, or a USB device. "Hybrid sleep" may implemented by some IHSs may use a hibernation file that is used to save the IHS's operating state, and also used to resume the IHSs operations upon reverting to a working S0 mode. "Fast startup" may refer to a power state where the user is logged off before the hibernation file is created, which allows for a smaller hibernation file in IHSs with reduced storage capabilities.

When in the S5 state ("Soft off" or "Full Shutdown"), an IHS 100 is fully shut down without a hibernation file. It occurs when a restart is requested or when an application invokes a shutdown command of the OS, EC 109, etc. During a full shutdown and re-boot, the user session is methodically de-constructed and restarted on the next boot. In some instances, a boot/startup from an S5 state takes significantly longer than resuming from S1-S4 states. At the hardware level, the main difference between S4 and S5 may be that S4 sets a flag on the storage device used to store the hibernation file and configures the bootloader to boot from the flagged hibernation file instead of booting the OS from scratch.

In a G3 ("Mechanical off") power mode, the IHS 100 may be completely turned off and consumes absolutely no power from its Power Supply Unit (PSU) or main battery (e.g., a lithium-ion battery), with the exception of any Real-Time Clock (RTC) batteries (e.g., Complementary Metal Oxide Semiconductor or "CMOS" batteries, Basic Input/Output System or "BIOS" batteries, coin cell batteries, etc.), which are used to provide power for the IHS's internal clock/calendar and for maintaining certain configuration settings. In some instances, G3 represents the lowest possible power configuration of an IHS from which the IHS can be initialized. From a G3 mode, an IHS may transition to an S5 mode in response to AC power source coupling (i.e., transitioning between battery mode to AC mode). Additionally, or alternatively, an IHS may transition from G3 to S0 based upon the detection of a power button event.

EC 109 firmware may also implement operations for detecting certain changes to the physical configuration or posture of IHS 100 (such as a laptop computer), and may also manage operations of other IHS devices based on the current physical configuration of IHS 100. For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, the EC 109 may enable or disable certain features of IHS 100 (e.g., front or rear facing camera, etc.).

In this manner, EC 109 may identify any number of IHS physical postures, including, but not limited to: laptop, stand, tablet, or book. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

In some implementations, EC 109 may be installed as a Trusted Execution Environment (TEE) component to the motherboard of IHS 100. Accordingly, as a component with the root of trusted hardware of IHS 100, EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based on instructions and settings loaded for use by a hardware component of IHS 100 and may compare the calculated value against the reference hash value to determine if any modifications have been made to the component, thus indicating that the component has been compromised. As such, EC 109 may validate the integrity of hardware and software components installed in IHS 100.

In some embodiments, EC 109 may provide an OOB (Out-Of-Band) or sideband channel that allows an ITDM or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to other IHS components, such as, for EC 109 and/or other devices within heterogeneous computing platform 200 (FIG. 2).

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), etc.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

Figure 2:
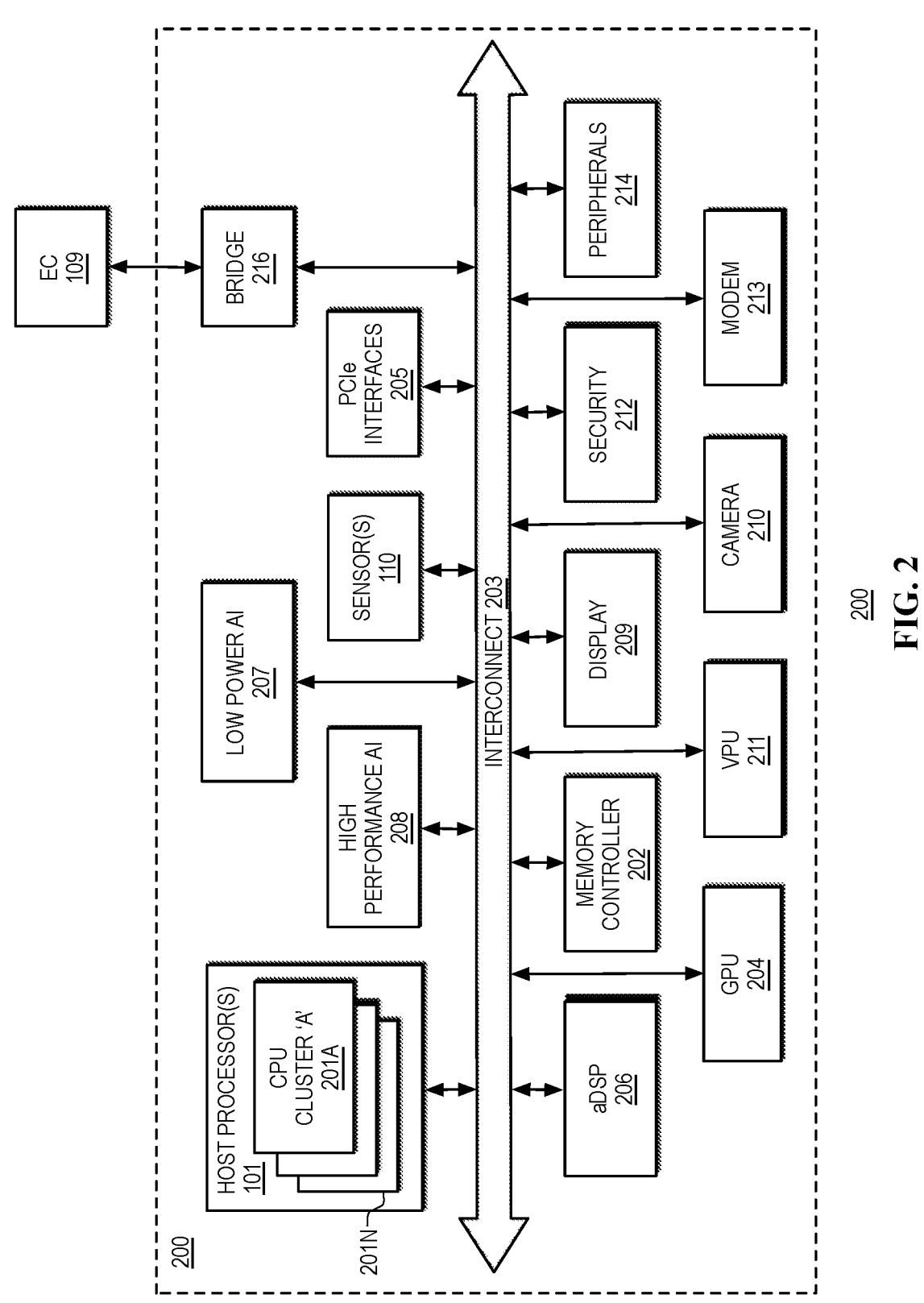
FIG. 2 is a diagram illustrating an example of a heterogenous computing platform configured, according to some embodiments, for securing boot telemetry generated by an IHS.

For instance, in various embodiments, host processor(s) 101 and/or other components shown in FIG. 1 (e.g., chipset 102, display controller(s) 104, communication interface(s) 105, EC 109, etc.) may be replaced by devices within heterogenous computing platform 200 (FIG. 2). As such, IHS 100 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, and/or mobile OSs (e.g., ANDROID, IOS, WINDOWS MOBILE, etc.). More recently, however, IHS manufacturers have started producing fully-fledged desktop and laptop IHSs equipped with ARM-based, heterogeneous computing platforms. Accordingly, host OSs (e.g., WINDOWS on ARM) have been developed to provide users with a familiar OS experience on those platforms.

FIG. 2 is a diagram illustrating an example of heterogenous computing platform 200 configured for securing boot telemetry generated by an IHS 100 in which the heterogenous computing platform is installed. In various embodiments, heterogenous computing platform 200 may be implemented in one or more SoCs, FPGAs, ASICs, or the like. Heterogenous computing platform 200 may include one or more discrete and/or segregated devices or components, each having a different set of processing capabilities suitable for handling a particular type of computational task. When each device in platform 200 is tasked with executing only the types of computational tasks that it is specifically designed to execute, the overall power consumption of heterogenous computing platform 200 is minimized.

In various implementations, some of the devices in heterogenous computing platform 200 may include their own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may be accessible through a respective Application Programming Interface (API). Additionally, or alternatively, some devices in heterogenous computing platform 200 may execute their own OS. Additionally, or alternatively, one or more of the devices of heterogenous computing platform 200 may be virtual devices and may thus operate virtual machines.

In the embodiment illustrated in FIG. 2, heterogenous computing platform 200 includes CPU clusters 201A-N that may correspond to system processor(s) 101, and that are intended to perform general-purpose computing operations.

Each of CPU clusters 201A-N may include one or more processing cores and cache memories. In operation, CPU clusters 201A-N are available and accessible to the IHS's host OS 300 (e.g., WINDOWS on ARM) and other applications executed by IHS 100.

CPU clusters 201A-N may be coupled to memory controller 202 via internal interconnect fabric 203. Memory controller 202 may be responsible for managing system memory access for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.). All devices coupled to internal interconnect fabric 203 may communicate with each other and with a host OS executed by CPU clusters 201A-N. In some cases, devices 209-211 may be coupled to internal interconnect fabric 203 via a secondary interconnect fabric (not shown). A secondary interconnect fabric may include any bus suitable for inter-device and/or inter-bus communications within an SoC.

A GPU 204 of the heterogenous computing platform 200 produces graphical or visual content and communicates that content to a monitor or display of the IHS 100 for rendering. In some embodiments, display engine 209 may be designed to perform additional video enhancement operations. In operation, display engine 209 may implement procedures for provide the output of GPU 204 as a video signal to one or more external displays coupled to IHS 100 (e.g., display device(s) 111). PCIe interfaces 205 provide an entry point into any additional devices external to heterogenous computing platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output (s). Examples of audio and speech operations include, but are not limited to: noise reduction, echo cancellation, directional audio detection, wake word detection, muting and volume controls, filters and effects, etc. In operation, input and/or output audio streams may pass through and be processed by aDSP 206, which can send the processed audio to other devices on internal interconnect fabric 203 (e.g., CPU clusters 201A-N). In some embodiments, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.).

Camera device 210 includes an Image Signal Processor (ISP) configured to receive and process video frames captured by a camera coupled to heterogenous computing platform 200 (e.g., in the visible and/or infrared spectrum). Video Processing Unit (VPU) 211 is a device designed to perform hardware video encoding and decoding operations, thus accelerating the operation of camera 210 and display/ graphics device 209. VPU 211 may be configured to provide optimized communications with camera device 210 for performance improvements.

Sensor hub 207 may include AI capabilities designed to consolidate information received from other devices in heterogenous computing platform 200, process context and/ or telemetry data streams, and provide that information to: (i) a host OS, (ii) other applications, and/or (iii) other devices in platform 200. In collecting data, sensor hub 207 may include General-Purpose Input/Output (GPIOs) that provide Inter-Integrated Circuit ($I^2C$), Improved $I^2C$ ($I^3C$), Serial Peripheral Interface (SPI), Enhanced SPI (eSPI), and/or serial interfaces to receive data from sensors (e.g., sensors 110, camera 210, peripherals 214, etc.). Sensor hub 207 may include a low-power core configured to execute small neural networks and specific applications, such as contextual awareness and other enhancements.

High-performance AI device 208 is a significantly more powerful processing device than sensor hub 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks. Using such capabilities, one or more devices of heterogeneous computing platform 200 (e.g., GPU 204, aDSP 206, sensor hub 207, high-performance AI device 208, VPU 211, etc.) may be configured to execute one or more AI model(s), simulation(s), and/or inference(s).

Security device 212 may include one or more specialized security components, such as a dedicated security processor, a Trusted Platform Module (TPM), a TRUSTZONE device, a PLUTON processor, or the like. In various implementations, security device 212 may be used to perform cryptography operations (e.g., generation of key pairs, validation of digital certificates, etc.) and/or it may serve as a hardware root-of-trust (RoT) for heterogenous computing platform 200 and/or IHS 100. As described in additional detail below, embodiments may utilize the security device 212 of the heterogenous computing platform 200 in securing boot sequence telemetry. In some embodiments, boot code of an IHS 100 may be configured to route collected boot telemetry directly from a secured boot location, such as an NVRAM used in a UEFI boot sequence, to security device 212.

Once encrypted by security device 212, the boot telemetry may then be securely stored in location that is available to the IHS 100. Through use of security device 212 of the heterogenous computing platform 200, boot telemetry may be encrypted without adding delays to the boot sequence, such as would result if instead relying on processors 101 of the IHS to encrypt boot telemetry. Moreover, cryptographic capabilities provided by security device 212 are more secure than those operated using general-purpose processors 101 that generally cannot be prevented from concurrent operation of multiple software processes, each a potentially vulnerability, whereas the much more limited attack surface of special-purpose security device 212 provides improved security.

Modem/wireless controller 213 may be designed to enable wired and wireless communications in any suitable frequency band (e.g., BLUETOOTH or "BT," WiFi, CDMA, 5G, satellite, etc.), subject to AI-powered optimizations/customizations for improved speeds, reliability, and/ or coverage. Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100, where configuration of such hardware may be via modifications to UEFI variables corresponding to a respective hardware component.

In some implementations, EC 109 may be integrated into heterogenous computing platform 200 of IHS 100. In other implementations EC 109 may be external to the heterogenous computing platform 200 (i.e., the EC 109 residing in its own semiconductor package) but coupled to integrated bridge 216 via an interface (e.g., enhanced SPI or "eSPI"), thus supporting the EC's ability to access the SoC's internal interconnect fabric 203, including sensor hub 207 and sensor(s) 110. Through this connectivity supported by the interconnect fabric 203, EC 109 may directly access and/or operate most or all of devices 201-216, 110 of the heterogenous computing platform 200.

Figure 3:
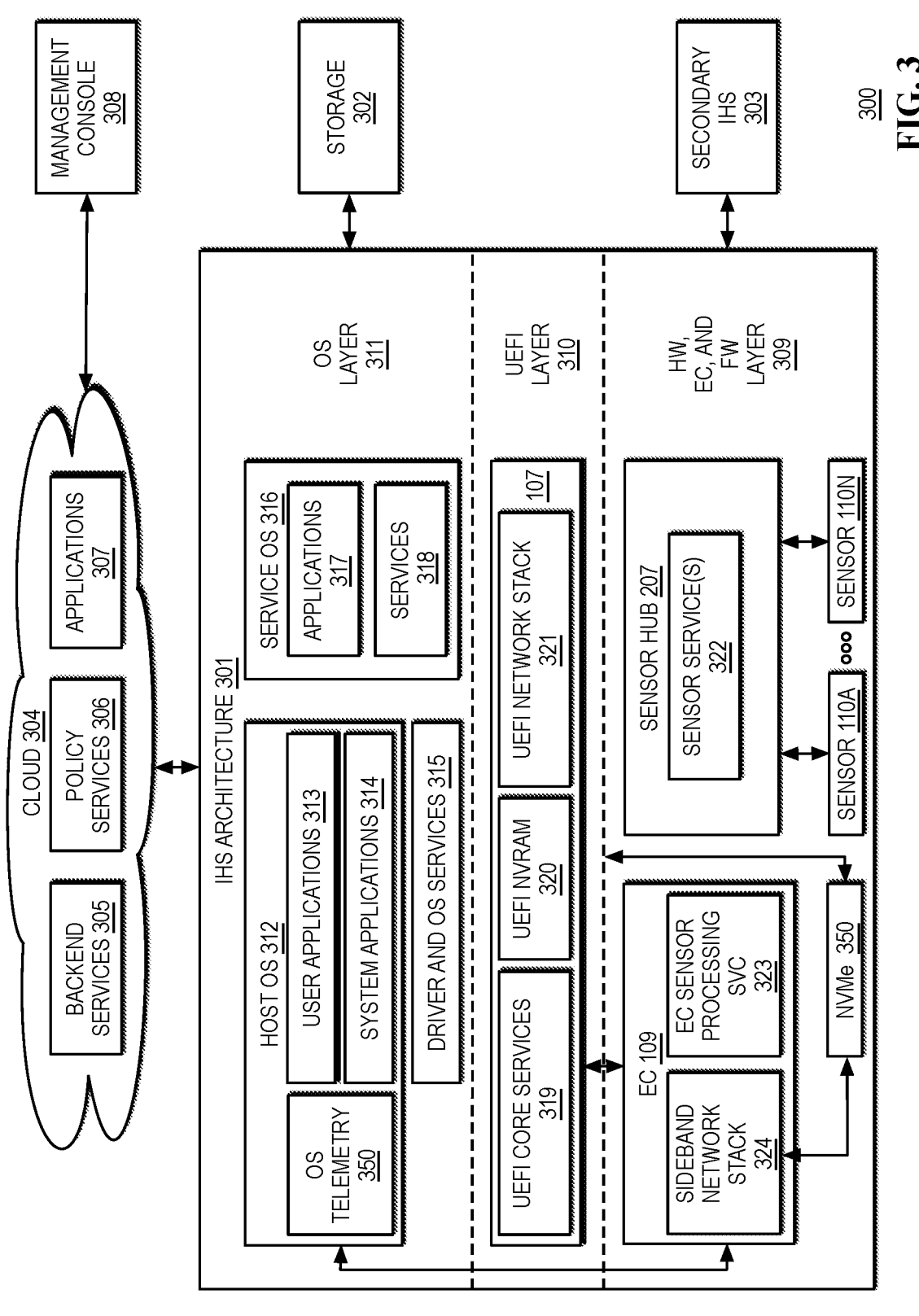
FIG. 3 is a diagram illustrating an example of a system, according to some embodiments, for securing boot telemetry generated by an IHS.

FIG. 3 is a diagram illustrating an example of architecture 300 for securing boot telemetry generated by an IHS 100 that operates a heterogenous computing platform 200, in particular for securing boot telemetry such that telemetry remains secured during and after the boot sequence of the IHS. As illustrated, architecture 300 includes IHS 301 (e.g., implementing aspects of IHS 100 and/or platform 200) coupled to storage device 302 (e.g., NVMe, SSD, etc.), secondary or companion IHS 303 (e.g., a smart phone, a laptop, etc.), and cloud or remote services 304. Cloud 304 may include backend or remote services 305, policy services 306, and web applications 307. In some cases, components of cloud 304 may be accessible to IHS 301 and/or secondary IHS 303, and configurable via ITDM management console 308. IHS architecture 301 may include hardware/EC/firmware layer 309, UEFI layer 107, and OS layer 311.

OS layer 311 includes a host OS (Operating System) 312 that is executed by host processor(s) 101. A variety of software applications may operate within the OS 312, where these applications may include user applications 313 and system applications 314, one or more OS telemetry applications 350. OS layer 311 may also include various drivers and other core OS operations, such as the operation of a kernel. As described, various components of a heterogenous computing platform 200 may independently run their own operating systems, such as an OS run by an SoC. Within IHS architecture 301, some of these discrete operating systems operating on individual components of the heterogenous computing platform 200 may be considered service OSs 316, where each service OS may each include its own applications 317 and services 318.

UEFI layer 107 may include UEFI core services 319, UEFI NVRAM 320, and UEFI network stack 321. UEFI core services 319 may include operations for identifying and validating the detected hardware components of an IHS. The UEFI network stack 321 may be utilized during initialization of the IHS in support of validation procedures, such as in retrieving reference signatures corresponding to authentic firmware instructions for hardware components of an IHS 100. UEFI core service 319 may also include operations for interfacing with certain hardware of an IHS, in particular user I/O hardware devices 350. As described in additional detail below, UEFI core services 319 may also include instructions for booting IHS 100. In some embodiments, the UEFI core services 319 may also include instructions for securing telemetry during the UEFI boot process.

The OS telemetry applications 350 may collect data generated by software and/or hardware located throughout an IHS 100. Once the IHS has been booted, security protocols may be operational such that telemetry may be collected, stored and processed securely by OS telemetry application 350. However, for boot telemetry that is generated during the booting of the IHS 100, these security procedures that are available for use by OS telemetry applications 350 are not operational. Accordingly, embodiments support secure storage of telemetry that is generated during a boot sequence, such as a UEFI boot sequence, such that the telemetry remains secured at all times both during and after the boot sequence.

As described in additional detail below, UEFI core services 319 may store boot telemetry in UEFI NVRAM 320 as the telemetry is collected. Portions of NVRAM 320 may be utilized to store core UEFI instructions and to store variables that are used to set UEFI boot and runtime variables that may be used to configure settings of individual hardware components of an IHS 100, such as configurable firmware operations of hardware components. Another portion of UEFI NVRAM 320 may be designated for use in storing boot telemetry. While collected boot telemetry is stored in UEFI NVRAM 320, the telemetry remains secured due to this NVRAM device being accessible exclusively to UEFI core services 319 such that unauthorized access to this NVRAM requires compromising UEFI itself.

Although collected boot telemetry remains secured while stored in UEFI NVRAM 320, this memory device is of limited capacity, with storage of boot telemetry being relegated to relative low priority when assigning the use of available storage capacity. Accordingly, when boot telemetry volumes approach the available capacity of UEFI NVRAM 320, embodiments provide capabilities for offloading collected boot telemetry from NVRAM 320 to a larger capacity NVMe 350 storage device (such as a Flash SSD), where this transfer includes routing of the boot telemetry to the security device 212 of a heterogenous computing platform 200 of the IHS 100, with the encrypted telemetry routed from this security device for storage in NVMe 350.

As illustrated, IHS architecture 301 also includes a hardware/EC/firmware layer 309 that includes EC 109 and sensor hub 207. As described above, EC 109 may implement a variety of procedures for management of individual hardware of an IHS 100 and of the IHS itself, including management of the various power states that are supported by the IHS. EC 109 is configured to execute one or more sensor services 323 that interface with sensor hub 207 in implementing various features of an IHS 100, such response to user-presence determination by the sensor hub 207 that is acted upon by the EC 109 in initiation heightened security protocols. As described, EC 109 may interface with some or all of the individual hardware components/systems of an IHS via sideband management channels that are separate from inline communication channels used by the host processor 101 and SoCs.

As described above, sensor hub 207 may receive inputs from some or all of the sensors 110A-N of an IHS 100. Sensor hub 207 may implement a variety of sensor service(s) 322 for communicating with and collecting data from sensors 110A-N. In some embodiments, sensor hub 207 may implement shock detection procedures that may incorporate inputs from inertial and other sensors 110A-N of an IHS. Such shock detection procedures may detect shocks experienced by an IHS 110 and may characterize and assess detected shocks in evaluating possible damage to the IHS.

Figure 4:
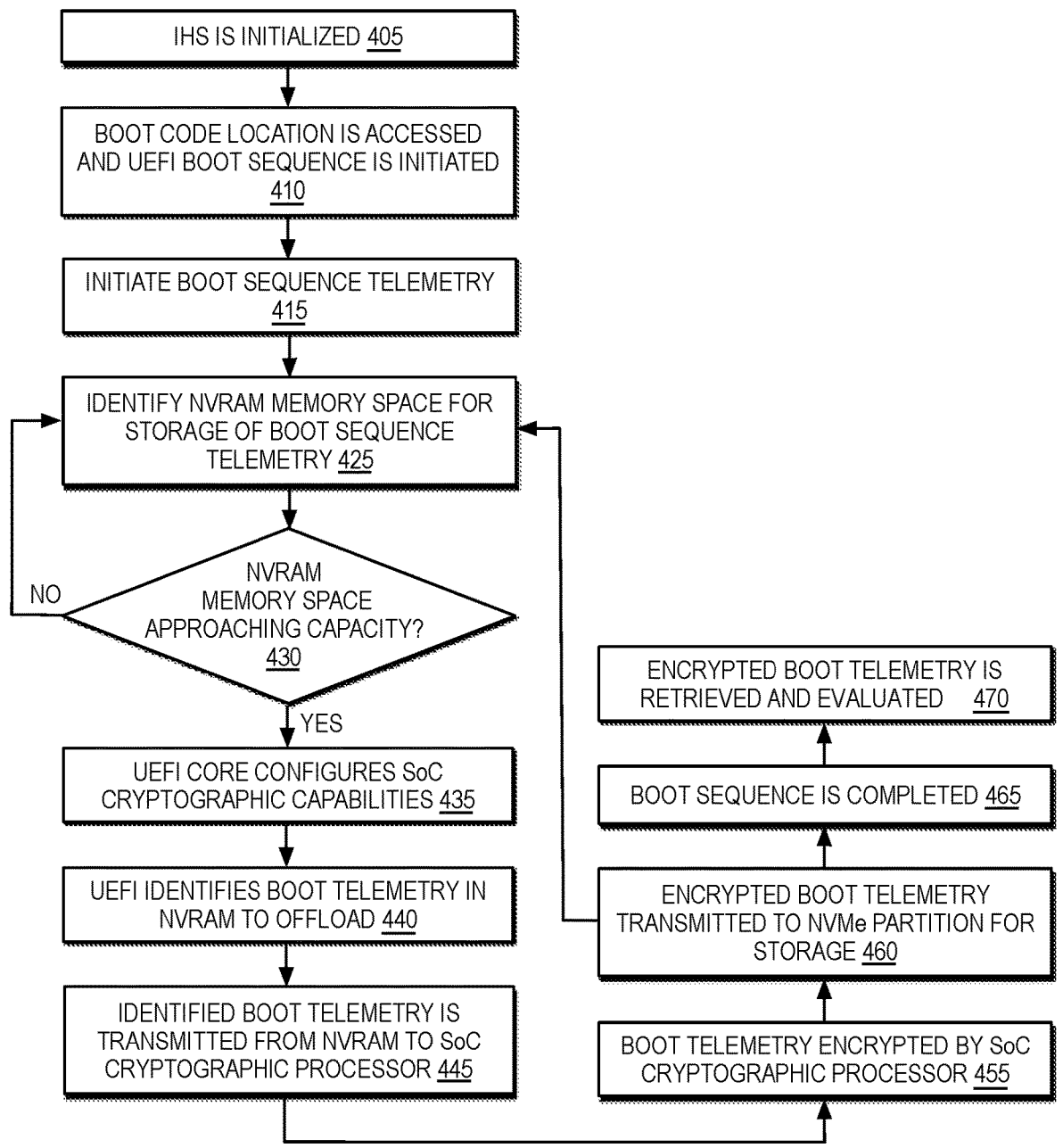
FIG. 4 is a diagram illustrating an example of a method, according to some embodiments, for securing boot telemetry generated by an IHS.

FIG. 4 is a diagram illustrating an example of a method, according to some embodiments, for securing boot telemetry generated by an IHS, and in particular for securing telemetry generated during a UEFI boot sequence of an IHS such that the boot telemetry remains secured both during and after the boot sequence. Embodiments may thus begin, at 405, with the initialization of an IHS 100 that includes a heterogenous computing platform 200. Upon being powered, at 410, secured boot instructions are accessed in order to initialize a host processor 101 and to locate instructions, in some embodiments stored in UEFI NVRAM 320, for initiating a UEFI boot sequence. The UEFI boot sequence may be described as a series of phases, where successful completion of one phase is generally required for the operation of subsequent phases of the boot sequence.

Telemetry may be generated and collected throughout each of the phases of the UEFI boot sequence. In some embodiments, the described boot sequence telemetry procedures may be implemented in the UEFI boot code. This boot telemetry may be generated by UEFI core services 319 and by the various hardware and software of the IHS as they are validated and initialized as part of the boot sequence. In some embodiments, UEFI core services 319 may initiate boot telemetry collection as soon as UEFI boot code has been validated as authentic and is thus ready for use in initiating the UEFI boot sequence.

In some embodiments, the initial collection of boot telemetry and the storage of the collected boot telemetry in the UEFI NVRAM 320 may be implemented in UEFI boot code. As the UEFI boot sequence progresses and UEFI NVRAM 320 reaches its storage capacity, UEFI core services 319 may load additional UEFI code for use in securing and offloading the boot telemetry. For instances, the UEFI boot sequence may be configured to detect when the UEFI NVRAM 320 partition that is available for use in storage of boot telemetry has reached 80% of its capacity, and in response to load additional boot code for use in securing and offloading boot telemetry stored in UEFI NVRAM.

As part of the operation of the UEFI boot code, at 420, embodiments may identify the memory space in UEFI NVRAM 320 that is available for storage of boot telemetry. At 425, the UEFI boot code routes received boot telemetry for storage in this UEFI NVRAM 320 partition. In some embodiments, the portion of UEFI NVRAM 320 available for boot telemetry may be a predefined partition of a fixed size. In embodiments, such a fixed partition of UEFI NVRAM 320 may be used as a secure buffer for boot telemetry that will be secured and offloaded. As described, other portions of UEFI NVRAM 320 may be used to store UEFI boot code and for maintaining UEFI variables, which are core functions of the IHS 100. As such, the portion of UEFI NVRAM 320 that is available for storage of boot telemetry may be limited.

Boot telemetry may be collected and routed to UEFI NVRAM 320 throughout each phase of the UEFI boot sequence. The boot instructions of the initial phase of the UEFI boot sequence may be used to validate the authenticity of host processor(s) 101, chipset 102, and the motherboard on which the processor is mounted. Boot telemetry from this phase may confirm the authenticated identities of these components. In the next phase of the UEFI boot sequence, the execution of UEFI 107 firmware retrieved from UEFI NVRAM 320 enters the PEI (Pre-EFI Initialization) phase. During this phase, initialization of authenticated host processor(s) 101, chipset 102 and the motherboard is completed, along with the initialization of system memory 103. Boot telemetry collected during the phase may specify firmware in use by these hardware components and may specify allocations of system memory.

The UEFI boot sequence also includes the Driver Execution (DXE) phase, where images of bus and core hardware device drivers are retrieved. Boot telemetry collected during this phase may identify core hardware of the IHS 100 and the drivers used to operate this hardware. With core hardware and bus drivers loaded and operating, the BDS (Boot Device Selection) phase is initiated and the location of the host OS 312 boot code is identified. In some instances, memory and disk space may be allocated for booting of the host OS 312 corresponding to the identified boot code. Boot telemetry collected during this phase may identify the location of OS boot code, as well as settings used in configuring the booting of the host OS 312, such as the disk space allocations and security settings to be used by the OS.

Once the BDS phase of the UEFI boot sequence has been completed, the IHS is ready to boot the host OS 312. In some instances, the UEFI boot sequence may include generation of various notification as part of the POST (Power-on Self-Test) procedures of the IHS that are implemented by various hardware components that are initialized as part of the boot sequence. Boot telemetry generated during this phase of the boot sequence may include some of all of the POST notifications and may also include a variety of telemetry characterizing the booting of the host OS 312. As boot telemetry is collected during each of these phases of the UEFI boot sequence, the boot telemetry is routed for storage in UEFI NVRAM 320.

As described, the storage capacity of UEFI NVRAM 320 that is allocated for storage of boot telemetry may be limited. Accordingly, in embodiments, at 430, the UEFI core services 319 monitors the available storage capacity in the UEFI NVRAM 320 and detects when this capacity is being approached. For instance, embodiments may signal the UEFI NVRAM 320 is approaching its boot telemetry capacity when less than ten percent (or less than another configurable threshold) of this capacity remains available for use. As indicated in FIG. 4, if this capacity threshold has not been reached, embodiments continue collecting telemetry and routing it for storage to UEFI NVRAM 320.

However, upon detecting the capacity threshold for storage of boot telemetry in UEFI NVRAM 320 has been reached, at 435, embodiments trigger procedures for securely offloading collected boot telemetry. As described above, during the boot sequence, some or all of the security protocols implemented by IHS 100 may not yet be operational, in particular security protocols that are applicable to telemetry collection. As such, without embodiments, offloading of boot telemetry during the boot sequence leaves important boot data vulnerable. In order to securely offload the boot telemetry, embodiments initiate procedures for encryption of the boot telemetry to be offloaded using cryptographic capabilities of the heterogenous computing platform 200. As described, an SoC used to implement a heterogenous computing platform 200 may include a security device 212 that includes cryptographic capabilities, where the specialized capabilities of the security device provide low-power and low-latency encryption capabilities.

In embodiments, these encryption capabilities of the heterogenous computing platform 200 may be used to secure boot telemetry. Once the security device 212 has been initialized and is available for use in encryption of boot telemetry, at 440, embodiments identify collected boot telemetry in the UEFI NVRAM 320 to be offloaded. In some embodiments, the oldest boot telemetry that is stored in the UEFI NVRAM 320 may be selected for offloading. When configured to operate in this manner, embodiments may utilize UEFI NVRAM 320 as a FIFO buffer where incoming collected boot telemetry is routed to the UEFI NVRAM as a new entry, with the oldest entry in the UEFI NVRAM selected for secure offloading. In some embodiments, boot telemetry is selected for offloading from the UEFI NVRAM 320 based on the size of the boot telemetry entries, with the largest sized entries selected for offloading first in order to free as much as space as possible in the NVRAM with each entry that is offloaded.

Once a boot telemetry entry in the UEFI NVRAM 320 has been identified for offloading, at 445, embodiments transmit this boot telemetry entry directly from its stored location in the NVRAM to the configured cryptographic processor of the heterogenous computing platform 200. In some embodiments, UEFI core services 319 may operate validated instructions in retrieving the boot telemetry entry from UEFI NVRAM 320 and transmitting the entry to the security device 212 via the interconnect 203 of the heterogenous computing platform 200. As described above, some embodiments may include multiple interconnects 203 for use by the heterogenous computing platform 200. In some embodiments, the interconnect 203 used to transmit boot telemetry to the security device 212 may be a bus connection available exclusively to UEFI 107 such that boot telemetry remains secured while being transmitted to security device 212.

Each boot telemetry entry that is transmitted by UEFI core services 319 is encrypted, at 450, by the security device 212. In some embodiments, security device 212 may utilize a platform encryption key specified, at 435, by the UEFI core services in configuring the security device. Through use of the platform encryption key, the boot telemetry is thus encrypted by the security device 212 in a manner that cryptographically anchors the telemetry to the IHS 100. Rather than export the telemetry for encryption by another system, encryption of the boot telemetry using the platform encryption key serves to validate that the telemetry has been secured by the IHS itself, where only the IHS 100 that is in control of the platform encryption key is able to decode the encrypted telemetry. In this manner, IHS 100 does not rely on external systems or OS capabilities in securing boot telemetry.

Once each individual boot telemetry entry has been encrypted, security device 212 transmits the encrypted telemetry for storage, such as on a designated partition of a non-volatile memory device, such as an NVMe flash SSD (Solid State Drive), that is accessible by the heterogenous computing platform 200 during the boot process. As indicated in FIG. 4, once the encrypted boot telemetry has been offloaded, embodiments may continue by routing additional collected telemetry to the UEFI NVRAM 320. The receipt of additional boot telemetry that causes the UEFI NVRAM 320 to remain above the capacity threshold results in additional transfer of boot telemetry from the UEFI NVRAM 320 to the security device 212 for encryption and offloading. In scenarios where the collection of boot telemetry does not result in the capacity threshold being surpassed, embodiments may continue telemetry collection and storage of the boot telemetry to the UEFI NVRAM 320.

In this manner, embodiments may collect and secure telemetry throughout the UEFI boot sequence. As described, one or more services OSs 316 may operate concurrently on IHS 100 in addition to host OS 312, such as on an SoC used to implement a heterogenous computing platform 200. Embodiments may thus collect boot telemetry that is generated as part of booting the host OS 312 and booting each of the service OSs 316. In some embodiments, boot telemetry generated as part of the booting of each OS 312, 316 may be designated for separate offloading destinations. For instance, boot telemetry generated as part of booting service OSs 316 may be encrypted by the security device 212 and separately routed for processing by the heterogenous computing platform 200, such as storage to a storage drive that is accessible via the PCIe interface 205 of the heterogenous computing platform 200, with other boot telemetry routed to a NVMe of the IHS 100.

From these storage location(s), at 470, the encrypted boot telemetry may be retrieved and utilized by various systems and tools. In some embodiments, the encrypted boot telemetry may be retrieved upon completion of the boot sequence and transmitted for long-term storage to a storage drive 113 of IHS 100. Secured in this manner, the encrypted boot telemetry may be stored for any amount of time until the telemetry is retrieved, decoded and utilized in analysis of the boot sequence. In some embodiments, upon completing the boot sequence, the encrypted boot telemetry may be retrieved and immediately transmitted for analysis by administrative tools operated by the cloud 304. In some embodiments, upon completing the boot sequence, the encrypted boot telemetry may be retrieved and immediately transmitted for analysis by telemetry systems 350 operated by the host OS 312. Regardless of when or how the telemetry is used, when the boot telemetry is secured in this manner, successful decoding of the retrieved telemetry is limited to security device 212, thus validating the boot telemetry as originating from IHS 100.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
an SoC (System-on-Chip);
an SSD (Solid-State Drive);
an NVRAM (Non-Volatile Random-Access Memory) configured to store boot instructions; and
one or more processors coupled to the NVRAM, wherein execution of the boot instructions by the one or more processors causes the IHS to:
initiate a boot sequence that includes generation of boot telemetry;
collect the boot telemetry in a partition of the NVRAM;
when a capacity of the partition of the NVRAM is determined to reach a threshold, transmit boot telemetry from the NVRAM to a security device of the SoC for encryption of the boot telemetry; and
store the encrypted boot telemetry in the SSD.

2. The IHS of claim 1, wherein the boot sequence comprises a UEFI boot sequence.

3. The IHS of claim 2, wherein the boot instructions comprise UEFI boot code.

4. The IHS of claim 3, wherein the NVRAM is exclusively accessible to the UEFI boot code.

5. The IHS of claim 3, wherein the UEFI boot code is configured to transmit the boot telemetry from the NVRAM to the security device of the SoC via a interconnect of the SoC.

6. The IHS of claim 5, wherein the interconnect of the SoC comprises a signal pathway that is exclusively accessible to the UEFI boot code.

7. The IHS of claim 1, wherein execution of the boot instructions by the one or more processors further causes the IHS to load additional boot code for configured to transmit boot telemetry from the NVRAM to the security device for encryption when the capacity of the partition of the NVRAM is determined to reach the threshold.

8. The IHS of claim 1, wherein the security device of the SoC comprises a device dedicated to implementation of security protocols for use by the IHS.

9. The IHS of claim 1, wherein the boot telemetry is encrypted by the SoC based at least in part on an encryption key of a keypair controlled by the IHS.

10. The IHS of claim 1, wherein the boot telemetry is encrypted and stored without use of capabilities provided by an operating system of the IHS.

11. A method for securing boot telemetry of an Information Handling System (IHS), the method comprising:
initiating a boot sequence of the IHS that includes generating boot telemetry;
collecting the boot telemetry in a partition of an NVRAM (Non-Volatile Random-Access Memory) of the IHS that stores boot instructions;
when a capacity of the partition of the NVRAM reaches a threshold, transmitting boot telemetry from the NVRAM to a security device of an SoC (System-on-Chip) of the IHS for encryption of the boot telemetry; and
storing the encrypted boot telemetry in an SSD (Solid-State Drive) of the IHS.

12. The method of claim 11, wherein the boot sequence comprises a UEFI boot sequence.

13. The method of claim 12, wherein the NVRAM is exclusively accessible to boot code used to implement the UEFI boot sequence.

14. The method of claim 11, wherein the security device of the SoC comprises a device dedicated to implementing security protocols for use by the IHS.

15. The method of claim 11, wherein the boot telemetry is encrypted by the SoC using an encryption key of a keypair controlled by the IHS.

16. The method of claim 11, wherein the boot telemetry is encrypted and stored without use of capabilities provided by an operating system of the IHS.

17. An NVRAM (Non-Volatile Random-Access Memory) storage device configured with instructions stored thereon, wherein execution of the instructions by one or more processors of an IHS (Information Handling System) causes the IHS to:
initiate a boot sequence of the IHS that includes generation of boot telemetry;
collect the boot telemetry in a partition of the NVRAM;

when a capacity of the partition of the NVRAM reaches a threshold, transmit boot telemetry from the NVRAM to a security device of an SoC (System-on-Chip) of the IHS for encryption of the boot telemetry; and store the encrypted boot telemetry in an SSD (Solid-State Drive) of the IHS.

18. The NVRAM storage device of claim 17, wherein the boot sequence comprises a UEFI boot sequence.

19. The NVRAM storage device of claim 17, wherein the security device of the SoC comprises a device dedicated to implementation of security protocols for use by the IHS.

20. The NVRAM storage device of claim 17, wherein the boot telemetry is encrypted by the SoC based at least in part on an encryption key of a keypair controlled by the IHS.

\* \* \* \* \*